United States Patent Office 2,908,963
Patented Oct. 20, 1959

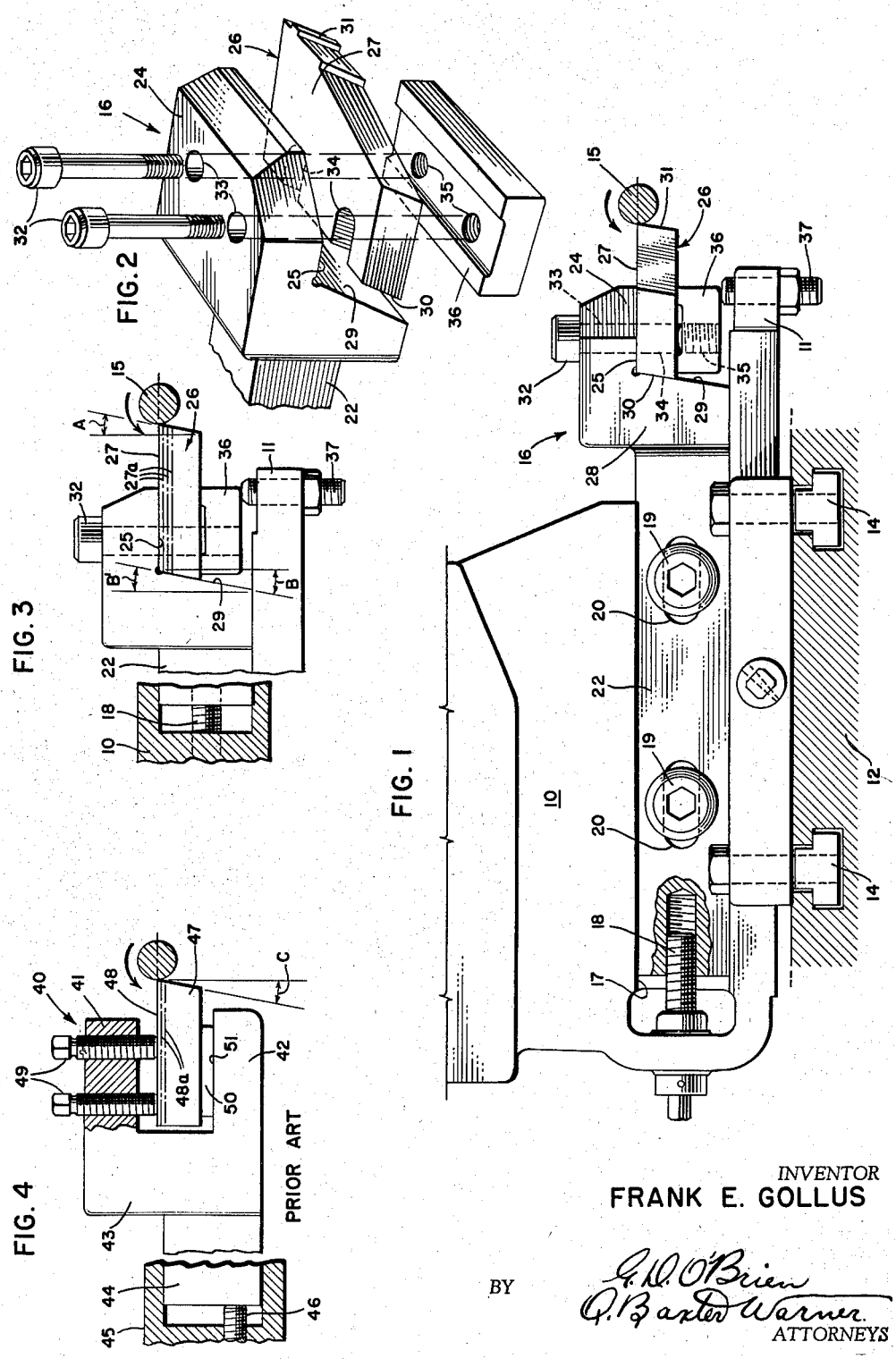

2,908,963
CUTTING TOOL

Frank E. Gollus, Hyattsville, Md.

Application November 1, 1957, Serial No. 694,057

1 Claim. (Cl. 29—96)

(Granted under Title 35, U.S. Code (1952), sec. 266)

The invention described herein may be manufactured and used by or for the Government of the United States of America for governmental purposes without the payment of any royalties thereon or therefor.

The present invention relates to cutting tools and more particularly to cutting tools of the type employed by automatic forming machines, such as the type used in mass producing a series of similar, interchangeable articles. In operation, a flat insertable forming tool bit, usually ground to the profile shape of the finished article, is automatically moved into and out of cutting relationship with a rotating workpiece and upon the termination of the cut, new work material is presented and the cycle repeated. After a certain number of articles are produced, it is then necessary to remove the tool bit from the tool assembly and have it sharpened. Sharpening a tool bit of this type, that is, one not having a top rake, consists of surface grinding only the top of the tool bit, this alone being sufficient to restore the original sharp cutting edge. The tool bit is then reinserted into the tool assembly and, in order to realign the tool bit with the work (i.e., with the horizontal center line), it is necessary to employ a shim or series of shims beneath the lower surface of the tool bit to replace, in effect, the material which was ground off the top of the tool bit and thereby restore the previous height thereof prior to the sharpening operation. Also, due to the angularity of the front clearance of the tool bit, removal of the upper surface will reduce the upper surface length of the bit and thus necessitate the transverse adjustment of the tool toward the workpiece. Any of the afore-mentioned steps which are not spent in actual production of articles are considered as "down" time or idle time and thus materially add to the cost of the finished articles.

The instant invention seeks to overcome the above and other disadvantages of prior art by providing a device so formed that repeated sharpenings will not alter the working length of the tool bit. A tool bit holder is formed with a tool bit locating surface so arranged as to matingly engage the upper surface and one of the thrust ends of the bit and upon reinsertion and registration of the bit after each sharpening, will ensure the exact alignment of the previous tool bit settings without any transverse or vertical adjustments thereof being required.

Therefore, it is one object of the present invention to provide a device that will provide for more rapid and accurate tool bit settings and yet decrease the number and complexity of settings previously necessary when tool bits were replaced or sharpened.

Another object of the present invention resides in the provision of a new and novel combination that reduces the "down" time or idle time after an initial setting has been made.

Still another object of the instant invention is the provision of a tool bit so formed as to have a minimum number of adjustment surfaces which must be employed during tool bit placement.

Other objects and many of the attendant advantages of this invention will be readily appreciated as the same becomes better understood by reference to the following detailed description when considered in connection with the accompanying drawings wherein:

Fig. 1 is a side elevational view of the novel combination of the instant invention, with portions thereof broken away, and illustrates the positioning of the invention relative to an automatic forming machine and its associated workpiece;

Fig. 2 is an exploded perspective view of a portion of the toolholder, the tool bit and associated securing and mounting parts of the present invention;

Fig. 3 is a side elevational view, similar to Fig. 1, illustrating the present inventive concept in diagrammatic form; and Fig. 4 is a side elevational view of a conventional tool bit and toolholder illustrated for comparison and descriptive purposes.

Referring now to the drawings, wherein like numerals identify similar parts, in Fig. 1 there is shown a conventional toolslide 10 secured to a forming slide 12 by any suitable means such, for example, as T-bolts 14 or the like, the forming slide 12 being movable toward the workpiece 15 by any suitable means (not shown). A toolholder 16 is transversely adjustable in a recessed guideway 17 formed in the toolslide 10 by means of adjusting screw 18 and when accurately positioned thereby, the toolholder 16 is secured by lock bolts 19 passing through elongated slots 20 formed in the shank 22 of the toolholder.

A horizontally disposed upper jaw 24 of the toolholder, integrally formed with the shank 22 and coextensive therewith, is accurately surface ground on its under surface to form a locating surface 25 for a tool bit 26 which surface will be constantly aligned in predetermined relationship with a horizontal center line passing through the workpiece and further engages a tool upper surface 27. A vertically disposed support 28, joining the upper jaw 24 and shank 22, has a tool thrust wall 29 angularly formed to accurately mate with a similarly angled thrust end 30 of tool bit 26. The cutting end 31 of tool bit 26 is formed with the conventional front clearance angle and, as is contemplated in the instant invention, the front clearance angle and the rear thrust end angle will be accurately ground at the same angles in reference to the upper surface 27 of the tool bit and thus, in effect, create a tool bit having the form of a parallelogram.

Referring now to Figs. 1 and 2, it will be readily apparent that the tool bit 26 is rigidly secured to the upper jaw 24 and against locating surface 25 by means of vertically aligned securing bolts 32. Bolts 32 pass freely through holes 33 formed in the upper jaw and continue through open-ended slots 34 formed in the tool bit 26 to threadably engage suitable threaded openings 35 located in pressure block 36, which is engageable with the undersurface of the tool. Thus, the major downward reaction of the bit 26 when cutting is absorbed by the rigid structure of the upper jaw 24. Additional tool bit reaction is partially absorbed by a horizontally disposed support portion 11 of the forming slide 10 comprising, in effect, the lower jaw of the toolholder. An additional lock screw 37, threaded vertically through the support portion 11, engages a lower side of the pressure block 36 adjacent a corner thereof and forms a fulcrum for the forces exerted on the cutting and thrust ends of the tool bit and further exerts a pressure in a rearward direction thus tending to ensure firm abutting engagement of the upper and thrust ends of the bit with corresponding surfaces of the toolholder when repositioning the bit after the latter has been sharpened or replaced.

Referring now to Fig. 3 it is seen that the tool bit front clearance angle A and tool bit thrust end angle B are equal and that the bit thrust wall angle B' mutually corresponds to that of the bit thrust end angle B. Repeated sharpenings and the consequent removal of the upper surface 27 of the tool bit are indicated by dashed lines 27a, each being equal in length, so that the repositionings of the bit after each sharpening will not alter the original or subsequent tool settings with respect to the workpiece. Removal and replacement of the tool bit involves the following operations: The upper securing bolts 32 are loosened and removed from the pressure block 36, lock screw 37 is loosened a slight amount and tool bit 26 is slid forwardly out of the toolholder 16. The entire upper surface 27 of the tool bit 26 is now ground a uniform amount sufficient to restore the original sharpness of the bit cutting end. The tool bit is now reinserted and the foregoing operations reversed.

In Fig. 4 there is illustrated a generalized version of a toolholder embodying some of the problems of adjustments found in prior art devices. A toolholder 40 has upper and lower jaws 41 and 42, respectively, each being joined by a vertical wall 43. Tool shank 44 is transversely adjustable in a tool slide 45 by means of adjusting screw 46. A cutting element or tool bit 47 has the conventional front clearance angle C formed at the forward end thereof. The opposite or thrust end is not utilized as such and is generally formed at right angles to the upper surface 48 of the bit. Hold-down screws 49 are employed to lock the tool bit in a downward direction against a shim 50 which, in turn, abuts the upper surface 51 of the lower jaw and corresponds to the locating or reference point. When the tool bit is to be sharpened, the hold-down screws 49 are loosened and the tool bit 47 is removed and surface ground as indicated by dashed lines 48a. The tool bit now is reinserted in the toolholder in reverse order from the foregoing except that additional adjustments will now be necessary. The length of the upper surface, as well as the vertical thickness of the tool bit, have both been diminished by the sharpening operation. Therefore, it is now necessary to accurately space the tool bit by a new shim of the proper thickness from the upper surface 51 of the lower jaw 42. A new shim, each of successively greater thicknesses, is thus required for each new repositioning of the tool bit. Additionally, transverse positioning of the tool bit is also effected by each sharpening operation, thus necessitating an adjustment of the feed screw 46.

The present invention has been shown and described in relation to automatic forming machinery. However, it is to be understood that the invention is not limited to rotary machine working. It is contemplated that a cutter of this type could be successfully used on devices such as surface planers wherein the tool bit could be sharpened a number of times without altering the cutting position or requiring any manual adjustments of the toolholder feed control.

Obviously many modifications and variations of the present invention are possible in the light of the above teachings. It is therefore to be understood that within the scope of the appended claim the invention may be practiced otherwise than as specifically described.

What is claimed is:

A cutting tool comprising, in combination, a tool bit having at least one flat locating surface thereon, an inclined cutting surface disposed on one end of said bit for engagement with a work piece during a cutting operation, an inclined thrust surface on the other end of said tool bit and disposed parallel with respect to said inclined cutting surface, said tool bit having a plurality of slots formed therein and extending therethrough at said thrust surface, a toolholder having a flat horizontal surface corresponding to said locating surface on the bit, and an inclined thrust resisting surface corresponding to said inclined thrust surface on the bit, said toolholder having a plurality of openings formed therein and extending therethrough, said inclined thrust resisting surface and the flat surface on said toolholder cooperating with said inclined surface and the flat locating surface on the bit, respectively, in a manner to invariably maintain said cutting surface in a constant predetermined cutting position with respect to said work piece regardless of the reduction in thickness of the bit during successive sharpening operations, a pressure block in engagement with said bit and releasably locked to said toolholder and having a plurality of threaded apertures formed therein, a plurality of threaded elements extending through said openings and slots and threaded into said apertures for releasably locking said pressure block to said toolholder in engagement with said bit for maintaining said bit locating and thrust surfaces in engagement with said thrust resisting and flat horizontal surfaces.

References Cited in the file of this patent

UNITED STATES PATENTS

| 1,187,099 | Rogers | June 13, 1916 |
| 1,216,060 | Breeden | Feb. 13, 1917 |
| 1,318,830 | Bartlett | Oct. 14, 1919 |
| 1,863,131 | Taylor | June 14, 1932 |
| 2,406,780 | Kutscha | Sept. 3, 1946 |
| 2,414,811 | Hollis | Jan. 28, 1947 |
| 2,455,230 | Cattin | Nov. 30, 1948 |
| 2,697,272 | Clark | Dec. 21, 1954 |

FOREIGN PATENTS

| 166,590 | Great Britain | July 11, 1921 |